(12) United States Patent
Belanger et al.

(10) Patent No.: US 8,176,320 B1
(45) Date of Patent: May 8, 2012

(54) SYSTEM AND METHOD FOR DATA ACCESS AND CONTROL

(75) Inventors: Brian N. Belanger, Scottsdale, AZ (US);
Rebecca K. Phillips, Phoenix, AZ (US);
Todd W. Sullivan, Gilbert, AZ (US);
Bonnie A. Kriewald, Mesa, AZ (US);
Frank J. Arkell, Scottsdale, AZ (US);
Carl H. Voegtly, Young, AZ (US)

(73) Assignee: Voice Signals LLC, Las Vegas, NV (US)

( * ) Notice: Subject to any disclaimer, the term of this patent is extended or adjusted under 35 U.S.C. 154(b) by 1041 days.

(21) Appl. No.: 10/659,368

(22) Filed: Sep. 11, 2003

(51) Int. Cl.
*G06F 21/00* (2006.01)

(52) U.S. Cl. .......................... 713/166; 713/168

(58) Field of Classification Search .................. 713/200, 713/166, 168; 726/28
See application file for complete search history.

(56) References Cited

U.S. PATENT DOCUMENTS

| | | | | |
|---|---|---|---|---|
| 6,003,014 A | * | 12/1999 | Lee et al. | 705/13 |
| 6,041,412 A | * | 3/2000 | Timson et al. | 726/3 |
| 6,587,836 B1 | | 7/2003 | Ahlberg et al. | |
| 6,839,843 B1 | * | 1/2005 | Bacha et al. | 713/176 |
| 6,959,336 B2 | * | 10/2005 | Moreh et al. | 709/229 |
| 6,978,381 B1 | * | 12/2005 | Te et al. | 726/18 |
| 2004/0049687 A1 | * | 3/2004 | Orsini et al. | 713/189 |

OTHER PUBLICATIONS

Department of Defense Trusted Computer System Evaluation Criteria, DOD 5200.28-STD, Dec. 26, 1985, accessed at http://www.radium.ncsc.mil/tpcp/library/rainbow/5200.28-STD.html on Nov. 10, 2003.

* cited by examiner

*Primary Examiner* — Nasser Goodarzi
*Assistant Examiner* — Carlton Johnson
(74) *Attorney, Agent, or Firm* — Sterne, Kessler, Goldstein & Fox PLLC

(57) ABSTRACT

The present invention provides techniques for granting access to secured data. An access candidate may access some or all of the secured data by gaining access to two sequential levels of security. The first security level secures access to the resources used to manipulate the secured data and the second security level secures access to the secured data by the resources. Attributes associated with the access candidate are considered in deciding whether to grant or deny access to the resources. Based on a comparison of access requirements of the secured data with the applicable attributes of the access candidate, a decision on whether to grant access to the requested portions of the secured data is made. If access is not prohibited, the access candidate may use the resources to access the secured data. If access is prohibited without authorization, a resolution request may be submitted to a resolution authority.

41 Claims, 5 Drawing Sheets

| | | ORG | EXPT | DOD/DOE | NSA | SAP |
|---|---|---|---|---|---|---|
| Access Agreement AND | US Citizen | $NP^3$ | $NP^3$ | $NP^3$ | $NP^3$ | $PWA^2$ |
| Located In US | Permanent Resident | $NP^3$ | $NP^3$ | $NP^3$ | PWA | $PWA^2$ |
| | Foreign National | $NP^3$ | $PWA^1$ | PWA | PWA | $PWA^2$ |
| Access Agreement AND | US Citizen | $NP^3$ | PWA | $NP^3$ | $NP^3$ | $PWA^2$ |
| Located outside of US | Permanent Resident | $NP^3$ | PWA | PWA | PWA | $PWA^2$ |
| | Foreign National | $NP^3$ | $PWA^1$ | PWA | PWA | $PWA^2$ |

1 - Requires export license or other authorization
2 - Requires sponsoring agency authorization
3 - Not prohibited but subject to subsequent need-to-know determination

Fig. 5

SYSTEM AND METHOD FOR DATA ACCESS AND CONTROL

FIELD OF THE INVENTION

The present invention relates generally to a process for controlling and providing access to secured electronic data and more particularly to a multilevel security process for processing requests and determining user authorization to access both secured electronic data and the means for accessing the secured electronic data.

BACKGROUND OF THE INVENTION

The benefits of securing data from unauthorized access are well known. However, many data security techniques are cumbersome in that they are fraught with parallel paths, circuitous routings, delays and frequent mistakes. Accordingly, an improved method for providing access to secured data would be advantageous.

SUMMARY OF THE INVENTION

The present invention mitigates or solves the above-identified limitations in known solutions, as well as other unspecified deficiencies in known solutions. A number of advantages associated with the present invention are readily evident to those skilled in the art, including economy of design and resources, transparent operation, cost savings, etc.

In accordance with one embodiment of the present invention, a method for providing an access candidate access to secured electronic data is disclosed. The method comprises the steps of submitting a request for access candidate access to the secured electronic data to a controller associated with the secured electronic data, comparing, at the controller, one or more attributes of the access candidate with one or more access requirements associated with the secured electronic data, submitting, by the controller, a request for authorization to a resolution authority when the comparison indicates that access by the access candidate is prohibited without authorization, and granting the access candidate access to the secured electronic data when the resolution authority provides authorization for such access.

In a data security system having a first security level securing one or more resources for manipulating electronic data and a second security level securing access to the electronic data by the one or more resources, a method for providing an access candidate access to the electronic data is disclosed in accordance with another embodiment of the present invention. The method comprises the steps of submitting a request for access to the first security level, granting the access candidate access to the first security level when a comparison of one or more attributes of the access candidate with one or more access requirements associated with the first security level indicates that access to the first security level by the access candidate is not prohibited and submitting a request for access to the second security level. The method further comprises the steps of submitting a request for authorization to a resolution authority when a comparison of one or more attributes of the access candidate with one or more access requirements associated with the second security level indicates that access to the second security level by the access candidate is prohibited without authorization and granting the access candidate access to the second security level should the resolution authority provide authorization.

In a data security system having a first security level securing one or more resources for manipulating electronic data and a second security level securing the electronic data, a method for providing an access candidate access to the electronic data is provided in accordance with an additional embodiment of the present invention. The method comprises the steps of identifying a plurality of data subsets of the electronic data, determining, for each data subset, at least one data class associated with the data subset, the at least one data class identifying at least a citizenship requirement and a location requirement for access to data associated with the data class and submitting, by a first sponsor of the access candidate, a request for access to the first security level, the request including an indication of a citizenship status of the access candidate, an indication of a current location of the access candidate, and an indication of an existence of a data access agreement with the access candidate. The method further comprises the steps of granting the access candidate access to the first security level based at least in part on an evaluation of the request for access to the first level, submitting, by a second sponsor of the access candidate, a request for access to at least one data subset at the second security level when access to the first security level has been granted, the request for access to the at least one data subset including an indication of a citizenship status of the access candidate and an indication of a current location of the access candidate, submitting a request for authorization to a resolution authority when a comparison of the citizenship status and the current location of the access candidate with the respective citizenship requirement and location requirement of the at least one data class of the requested data subset indicates that access to a requested data subset at the second level by the access candidate is prohibited without authorization, and granting the access candidate access to the requested at least one data subset at the second security level when the resolution authority provides authorization upon receipt of the request for authorization.

In accordance with yet another embodiment of the present invention, a system for providing an access candidate access to secured electronic data is disclosed. The system comprises storage adapted to receive and store the electronic data, one or more resources adapted to access and manipulate the electronic data, and means for evaluating a request for access candidate access to the one or more resources the evaluation of the request including a first comparison of one or more attributes of the access candidate with one or more access requirements associated with the one or more resources. The system further comprises means for granting the access candidate access to the one or more resources when the first comparison indicates that access is not prohibited and means for evaluating a request for access candidate access to the electronic data by the one or more resources, the evaluation of the request including a second comparison of one or more attributes of the access candidate with one or more access requirements associated with the electronic data. The system additionally comprises means for submitting a request for authorization to a resolution authority when the second comparison indicates that access to the electronic data by the access candidate is prohibited without authorization and means for granting the access candidate access to the electronic data using the one or more resources when the resolution authority provides authorization.

In accordance with an additional embodiment of the present invention, a system for providing an access candidate access to secured electronic data is provided, the electronic data being associated with one or more data classes, each data class identifying at least a citizenship requirement and a location requirement for access to data associated with the data class. The system comprises storage adapted to receive and store the electronic data, one or more resources adapted to process and manipulate the electronic data, and a resource access controller adapted to grant access to the one or more resources based at least in part on a comparison of a citizenship status and a current location of the access candidate and an existence of a data access agreement with a citizenship requirement, location requirement and data access agreement requirement associated with the one or more resources. The system further comprises one or more data access controllers adapted to grant access to a corresponding portion of the electronic data based at least in part on a comparison of a citizenship status and a current location of the access candidate with a citizenship requirement and a location requirement associated with one or more data classes of the corresponding portion of the electronic data and one or more resolution authorities adapted to authorize access to one or more portions of the electronic data when a comparison performed by a corresponding data access controller indicates access is prohibited without authorization. The system additionally comprises a data access module adapted to evaluate a request for access to one or more portions of the electronic data by the one or more resources to identify one or more data access controllers corresponding to the one or more portions of the electronic data and forward the request for access to the one or more identified data access controllers for evaluation as to whether to grant the access candidate access to the corresponding one or more portions of the electronic data.

In accordance with yet another embodiment of the present invention, a method for determining an access candidate's access to secured electronic data is provided. The method comprises the steps of submitting a request for access to the secured electronic data to a controller associated with the secured electronic data, comparing, at the controller, one or more attributes of the access candidate with one or more access requirements associated with the secured electronic data, and submitting, by the controller, a request for authorization to a resolution authority when the comparison indicates that access by the access candidate is prohibited without authorization, wherein the resolution authority processes access candidate information, requests related information and determines whether to authorize the access candidate's access to the secured electronic data. The method further comprises granting or denying by the controller, in whole or in part, the access candidate access to the secured electronic data based at least in part on the resolution authority's determination.

In accordance with an additional embodiment of the present invention, a method for determining an access candidate's access to secured electronic data is provided. The method comprises the steps of submitting a request for access to the secured electronic data to a controller associated with the secured electronic data, comparing, at the controller, one or more attributes of the access candidate with one or more access requirements associated with the secured electronic data, and granting the access candidate access to the secured electronic data when the comparison indicates that access by the access candidate is not prohibited. The method further comprises the steps of submitting, by the controller, a request for authorization to a resolution authority when the comparison indicates that access by the access candidate is prohibited without authorization and performing the following steps: the resolution authority processing access candidate information and request related information and determining whether to authorize the access candidate's access to the secured electronic data; and granting or denying by the controller, in whole or in part, the access candidate access to the secured electronic data based at least in part on the resolution authority's determination.

In a data security system having a first security level securing one or more resources for manipulating electronic data and a second security level securing access to the electronic data by the one or more resources, a method for determining an access candidate's access to the electronic data is provided in accordance with yet another embodiment of the present invention. The method comprises the steps of submitting a request for access to the first security level, determining the access candidate's access to the first security level based on a comparison of one or more attributes of the access candidate with one or more access requirements associated with the first security level, submitting a request for access to the second security level, submitting a request for authorization to a resolution authority when a comparison of one or more attributes of the access candidate with one or more access requirements associated with the second security level indicates that access to the second security level by the access candidate is prohibited without authorization and determining by the resolution authority the access candidate's access to the second security level.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which:

FIG. 5 is a table illustrating exemplary access attributes associated with various exemplary data classes in accordance with at least one embodiment of the present invention.

DETAILED DESCRIPTION OF THE INVENTION

The following description is intended to convey a thorough understanding of the present invention by providing a number of specific embodiments and details involving access to secured electronic data. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

FIGS. 1-5 illustrate exemplary techniques for providing access to secured electronic data. In at least one embodiment, an access candidate gains access to some or all of the secured data by gaining access to two sequential levels of security, where the first security level secures access to the resources used to manipulate the secured data and the second security level secures access to the secured data by the resources. To gain access to the resources, a sponsor of the access candidate submits an access request. Access attributes associated with the access candidate are considered in deciding whether to grant or deny access to the resources. After access to the resources is obtained, the same sponsor or a different sponsor submits a request for access to one or more portions of the secured data. Based on a comparison of one or more access requirements of the one or more portions of the secured data with the applicable access attributes of the access candidate, a decision on whether to grant access to the requested portions of the secured data is made. If access is granted (or not prohibited), the access candidate may use the resources to manipulate the secured data. If access is prohibited without authorization, a resolution request may be submitted to a resolution authority. The resolution authority may use the attributes, the access requirements as well as additional information to decide whether to authorize the grant of access or decline authorization. As used herein, the term access candidate preferably includes an entity requiring or desiring access to some or all of the secured data, such as a newly hired employee assigned to a project having secured data. The data may be discrete elements of data, collections of data or data files, an entire or portion of a database, etc.

Figure 1:
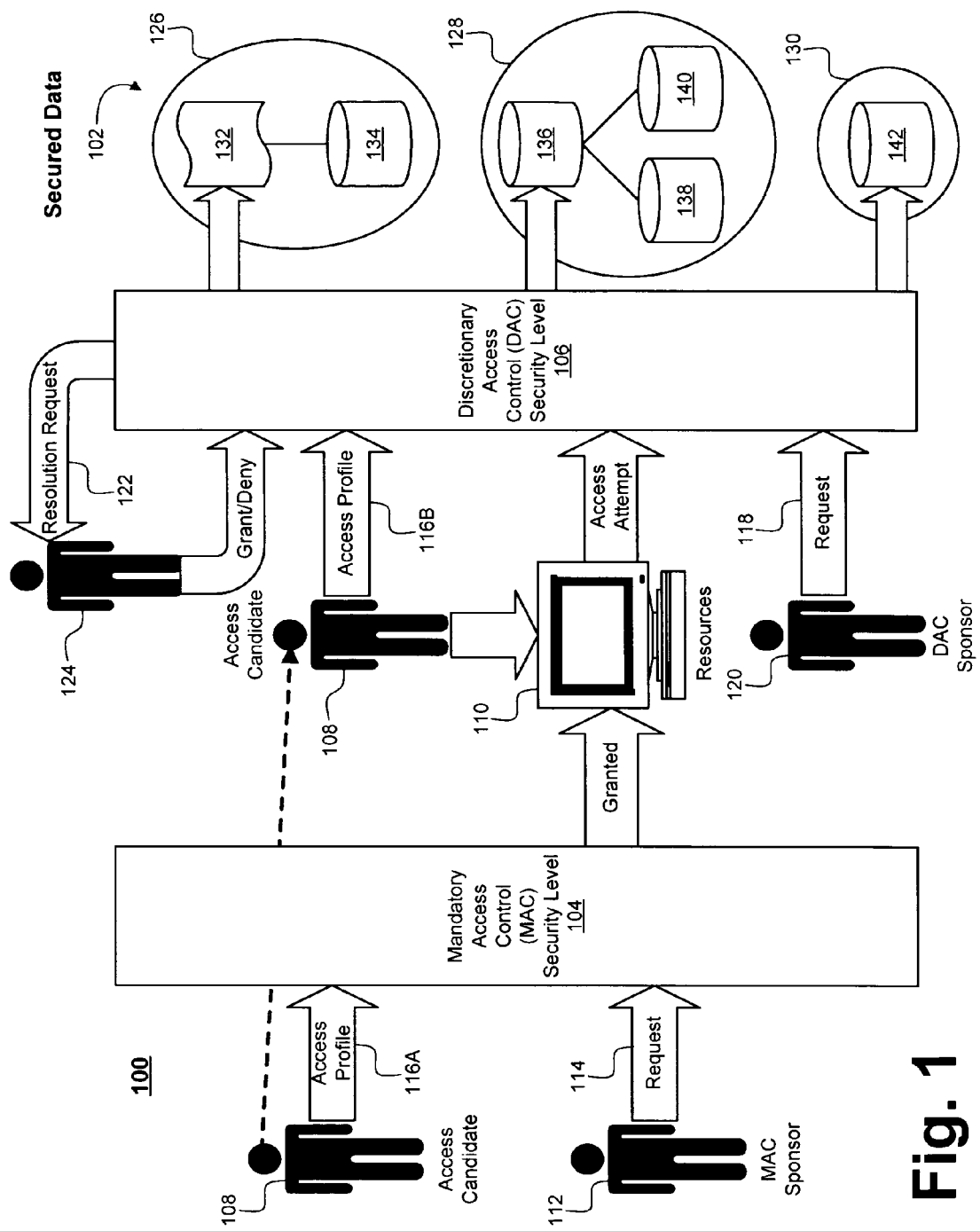
FIG. 1 is a schematic diagram illustrating an exemplary multilevel data access system in accordance with at least one embodiment of the present invention.

Referring now to FIG. 1, an exemplary multilevel data access system 100 is illustrated in accordance with at least one embodiment of the present invention. The system 100 preferably is utilized to provide authorized users access to secured electronic data 102 while preventing access by unauthorized users. The electronic data 102 may be secured using any of a variety of techniques known to those skilled in the art. For example, the electronic data 102 may be stored in one or more databases or files that are protected by password, access permissions, and/or encryption. Further, the electronic data 102 may be stored in one or more directories having security measures in place, such as hidden directories, password or encryption protected directories, and the like. As discussed in greater detail below, the electronic data 102 further may be secured from access by securing the resources used to manipulate the electronic data 102. For example, the data may be manipulated in any of a variety of data operations, such as, for example, displaying data, copying data, transferring data, deleting data, modifying data, printing data, and the like. The data access system of the present invention may be employed in a number of systems, including, for example, a knowledge management system.

The system 100, in at least one exemplary embodiment, includes two security levels: a mandatory access control (MAC) security level 104 and a discretionary access control (DAC) security level 106. To gain access to secured electronic data, an access candidate 108 preferably must successfully access both the MAC security level 104 and the DAC security level 106.

The MAC security level 104 preferably is configured to control access to one or more resources 110 used to manipulate the secured data. The resources 110 may include, for example, a computer or processor based workstation and related software connected to a secured data server storing the secured data 102, a software application used to manipulate the secured data 102, a printer used to provide a printed representation of the secured data 102, etc. To illustrate, in one embodiment, the MAC security level 104 may be implemented in part as the security checkpoint through which the access candidate 108 gains physical access to the workstation and software applications (i.e., resources 110) used to access the secured data. Physical access to the resources 110 may be accomplished by, for example, gaining access to a facility housing the resources 110. Physical access may also include logging on to the workstation or software application used to access secured data.

After gaining physical access, the MAC security level 104, in one embodiment, also is responsible for granting directory access. Directory access preferably includes access to basic network resources, such as accounts provided for email access, access to the access candidate's home drive, access to public directories, etc. Directory access preferably provides access to less sensitive data and applications typically found, for example, on Internet portals. For example, the resources 110 may include a website used to display secured data and the MAC security level 104 may be implemented as a security protocol through which the access candidate 108 gains directory access to the website.

The MAC security level 104 may grant access to the access candidate 108 in any of a variety of ways. Preferably, the MAC sponsor 112 submits an access request 114 as an indication that the MAC sponsor 112 desires to have MAC access granted to the access candidate 108. However, the access request 114 may be submitted by the access candidate 108, the MAC sponsor 112, or a combination thereof. The MAC sponsor 112 may be associated with the access candidate 108 in any of a variety of ways. For example, the MAC sponsor 112 may include an employer or supervisor or business associate of the access candidate 108, an "owner" or controller of part or all of the secured data 102 or resources 110, a neutral third party, and the like. Although illustrated in the figures in human form, "sponsors" may be in the form of automated processes and may or may not involve human interaction.

Additionally, an access profile 116A associated with the access candidate preferably is submitted for evaluation. The access profile 116A may be submitted by the access candidate 108, the MAC sponsor 112, or a combination thereof. Alternatively, the access profile 116A may be retrieved for review from, for example, network or third party storage. The access profile 116A includes one or more access attributes associated with the access candidate 108 that may be useful to the MAC security level 104 in deciding to grant or deny the access request 114 submitted by the MAC sponsor 112. The attributes typically are specific to the requirements necessary to access the resources 110 via the MAC security level 104. For example, in certain circumstances, access to the resources 110 may be predicated on the existence of a valid data access agreement (e.g., an agreement not to disclose information without prior authorization) with the access candidate 108, that the access candidate 108 have a certain citizenship status and that the access candidate 108 is located within a certain geographical or political boundary. In such circumstances, the access profile 116A may include an indication of the existence of a data access agreement and an indication of the access candidate's citizenship and current location, among other applicable attributes. Documents and other evidence may be submitted by the access candidate 108 or MAC sponsor 112 to verify the information provided in the access profile 116A.

The comparison of the access profile 116A with the access attributes required for the grant of access to resources 110 may be performed manually, such as by a security technician who reviews the request 114, the access profile 116A and any supplied proof against the access attributes. Alternatively, the comparison may be automated, in whole or in part, by an automated system (e.g., a software application) adapted to review the request 114, the access profile 116A and any supplied proof.

Should the comparison indicate that access is prohibited without authorization, the MAC security level 104 may so inform the MAC sponsor 112 and/or the access candidate 108. In the event that the access profile 116A incorrectly describes one or more attributes of the access candidate 108 and these errors were the cause of the denial of access, the MAC sponsor 112 or the access candidate 108 may correct the access profile 116A and resubmit the access profile 116A for reconsideration. If, however, the attributes of the access candidate 108 were described correctly, the MAC sponsor 112 and/or the access candidate 108 may attempt to change one or more attributes (e.g., relocate the access candidate 108) or the MAC sponsor 112/access candidate 108 may appeal for a waiver of one or more access requirements or a modification of the access requirements.

Should the comparison indicate that the access candidate 108 is not prohibited from accessing the resources 110, the MAC security level 104 may grant the access candidate 108 access to the resources 110. Any of a variety of techniques may be used to grant access. For example, the access candidate 108 may be supplied one or a series of user identifications (ID) and/or passwords which may be used to access the resources 110 and/or a network profile associated with the access candidate 108 may be modified to allow access to the resources 110. Further, one or more administrators may modify access permissions associated with the access candidate's account. Access also may be granted by, for example, allowing the access candidate 108 to have physical access to the resources 110.

After gaining access to the resources 110, in one embodiment, the access candidate 108 is required to gain access to the secured data 102 via the DAC security level 106. In one embodiment, various portions of the secured data 102 are associated with one or more data classes, where each data class has a specific set of access requirements. For example, data may be separated into various data classes based on its ownership or origin. To illustrate, portions of the secured data 102 may include data provided by, or generated in cooperation with, a government entity, such as the Department of Energy (DOE), Department of Defense (DOD) or National Security Agency (NSA). Alternatively, although portions of the secured data 102 may not be classified per se, they may fall under one or more rules, regulations or laws controlling the transfer of sensitive information, such as laws and regulations applicable to the export of technical information. Accordingly, each of these providers or regulators of data may have various requirements for gaining access to the data, such as citizenship, current location, and the like. Accordingly, portions of the secured data 102 may be identified by data owner or originator, or by the laws, rules and regulations applicable to the data portions.

Access through the DAC security level 106 may be granted by submitting an access request 118 from a DAC sponsor 120 on behalf of the access candidate 108. As with the MAC sponsor 112, the DAC sponsor 120 may be associated with the access candidate 108 in any of a variety of ways. For example, the DAC sponsor 120 may be an employer or supervisor of the access candidate 108, an owner or manager of part or all of the secured data 102, or a neutral third party. In one embodiment, the MAC sponsor 112 and the DAC sponsor 120 are the same entity.

In addition to the access request 118, an access profile 116B associated with the access candidate 108 may be provided to, or obtained by, the DAC security level 106. The access profile 116B includes one or more attributes associated with the access candidate 108 that may be useful to the DAC security level 106 in deciding to grant or deny the access request 118 submitted by the MAC sponsor 120. As noted above, various data classes may be associated with the secured data, where each data class has a specific set of access requirements. Accordingly, the access profile 116B may include attributes related to the access requirements of the data classes to which the secured data 102, or requested portion(s) thereof, belongs. The access requirements may include, for example, a certain citizenship status, a certain current geographical location, the existence of a valid data access agreement with the access candidate 108, and the like. In at least one embodiment, the access profile 116A and the access profile 116B are the same access profile. Further, as described in greater detail below with reference to FIG. 4, the access profiles 116A, 116B preferably are implemented as part of a graphical display.

The DAC security level 106 may be adapted to compare the access profile 116B with the access attributes associated with the one or more data classes of the requested portion(s) of the secured data 102. The comparison may be performed manually or the comparison may be automated, in whole or in part, by an automated system adapted to review the request 118, the access profile 116B and any supplied proof.

Should the comparison performed by the DAC security level 106 indicate that access to one or more data classes of the secured data is prohibited without authorization, the DAC security level 106 may submit a resolution request 122 to a resolution authority 124. The resolution authority 124, in one embodiment, includes an entity or automated system authorized to provide authorization for access, such as, for example, an "owner" of the data, a supplier of the data, and the like. The authorization may be determined by granting a waiver of the access requirements of one or more data classes, modifying the access requirements, excluding data assigned to one or more prohibited data classes from access by the access candidate 108, and the like. In the event that authorization cannot be resolved based on the supplied request, the DAC security level 106 may so inform the DAC sponsor 120 and/or the access candidate 108. The DAC sponsor 120 and/or access candidate 108 then may attempt to change one or more attributes associated with the access candidate 108 and resubmit the access request 118.

Should the comparison indicate that the access candidate 108 is not prohibited from accessing the secured data 102 or should the resolution authority 124 provide authorization, the DAC security level 106 may grant the access candidate 108 access to the portion(s) of the secured data 102 for which access is sought. Any of a variety of techniques may be used to grant access including, for example, the provision of a password, the modification of a network profile, or the transfer of secured data from a secure storage location to a location accessible by the resources 110. After access is granted by the DAC security level 106, the access candidate 108 may utilize the resources 110, as well as additional resources, to manipulate and modify the requested portion of the secured data.

In at least one embodiment, various portions of the secured data 102 are associated with one or more levels of data. For example, the secured data 102 may be grouped into an application level 126, a group information level 128 and an item information level 130. The application level 126 may include, for example, one or more software applications (e.g., application 132) that are enabled to create and modify data 134, where the data 134 may be an integral portion of the application or may be disassociated from the application 132. The group information level 128 may include, for example, a hierarchical collection of data (e.g., data 136-140) that may or may not be associated with a specific software application. The item information level 130 may include, for example, low level data (e.g., data 142) that may or may not be associated with a specific software application. Accordingly, the above-described process for accessing a portion of the secured data 102 via the DAC security level 106 preferably is repeated for each level to which the portion of secured data 102 belongs. To illustrate, if the access candidate 108 desires access to a portion of the secured data 102 that is a member of both the group information level 128 and the item information level 130, the DAC security level access process may be performed twice, once for the group information level 128 and once for the item information level 130, before the access candidate 108 may access the data.

Figure 2:
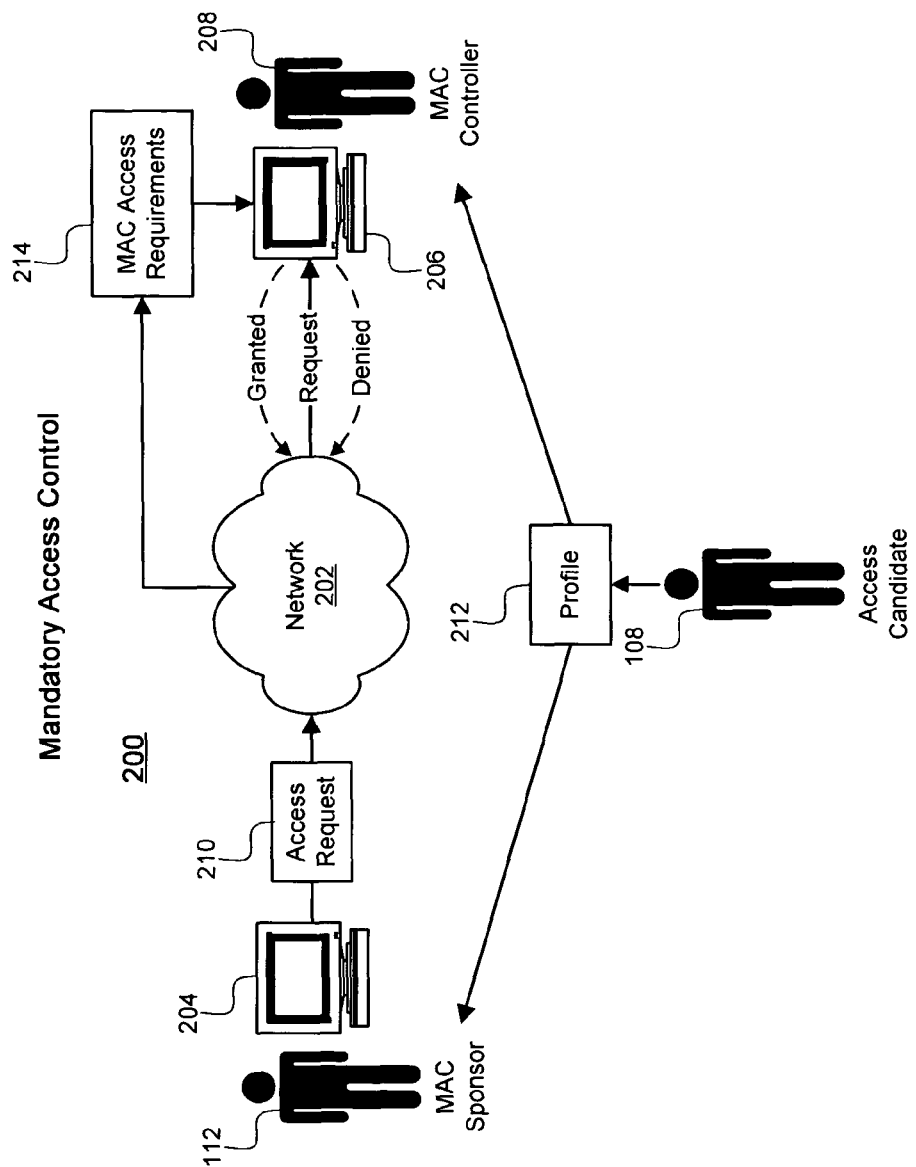
FIG. 2 is a flow diagram illustrating an exemplary process for providing access to resources used to manipulate secured data in accordance with at least one embodiment of the present invention.

Referring now to FIG. 2, an exemplary network-based MAC access process 200 is illustrated in accordance with at least one embodiment of the present invention. As noted above, a grant of access by the MAC security level 104 (FIG. 1) preferably is required before an access candidate 108 may access the resources 110 used to manipulate the secured data 102. In at least one embodiment, the process for granting MAC access is performed at least in part through the use of a network 202, where the network 202 may include the Internet, a local area network (LAN), a wide area network (WAN), and the like.

The network 202 preferably is used to connect a workstation 204 used by the MAC sponsor 112 with a workstation 206 used by a MAC controller 208. The MAC controller 208, in one embodiment, includes an entity or automated system enabled to grant MAC access to the access candidate 108 when the grant of such access is not prohibited. To initiate access, the MAC sponsor 112 prepares an electronic access request 210 (one embodiment of the access request 114, FIG. 1) using the workstation 204 and submits the electronic access request 210 to the MAC controller 208 via the network 202. In the alternative, the process may be initiated by a request for data/access by the candidate 108, which may cause MAC sponsor 112 to prepare an electronic access request 204. In preparing the electronic access request 210, the MAC sponsor 112 may utilize information provided by the access candidate 108 as a profile 212 (one embodiment of the access profile 116A, FIG. 1). The profile 212 may include one or more attributes associated with the access candidate 108, such as citizenship information, current location information, criminal record, employment information, an indication of a valid data access agreement, and the like. The profile 212 may be electronically submitted to the MAC sponsor 112 or the MAC controller 208 via the network 202 or another network connection. The profile 212 and the access profiles 116A or 116B may include the same profile. Further, in one embodiment, the access profile 116A/116B/212 is part of a graphics-based network directory available via the network 202 (described below with reference to FIG. 4).

Upon receipt of the electronic access request 210, the MAC controller 208 may identify the one or more data classes associated with the portion of the secured data 102 requested by the MAC sponsor 112. The MAC controller 208 then may identify the access requirements associated with the one or more data classes and compare the access requirements with the attributes of the access candidate 108 submitted as the electronic access request 210/profile 212. In at least one embodiment, the access requirements are available to the MAC controller 208 as one or more access requirements files 214 stored on a data server of the network 202 or on the workstation 206. The access requirements file 214 preferably includes data formatted for display as a table or other arrangement on the display of the workstation 206 (described below in FIG. 5).

In deciding whether to grant access, the MAC controller 208 compares the access requirements of the identified data classes with the attributes of the access candidate 108. This comparison may be performed manually by the MAC controller 208 by, for example, visually comparing a display of the access candidate's attributes with a display of the access requirements. Alternatively, the MAC controller 208 may utilize a software application to automate the comparison. In the event that the attributes are compliant with the access requirements (i.e., the comparison indicates that access is not prohibited), the MAC controller 208 grants access to the resources 110 by, for example, providing the access candidate 108 or MAC sponsor 112 with a ID/password, changing a network profile of the access candidate 108, and the like. The MAC controller 208 further may notify the MAC sponsor 112 or access candidate 108 by sending an email or other communication via the network 202.

In the event that the attributes of the access candidate 108 are in conflict with the access requirements (i.e., the comparison indicates that access is prohibited without authorization), the MAC controller 208 may send the MAC sponsor 112 or access candidate 108 an email or other communication indicating such via the network 202. The MAC sponsor 112 and access candidate 108 then may modify the electronic access request 210 and resubmit the access request 210 or they may appeal the decision.

Figure 3:
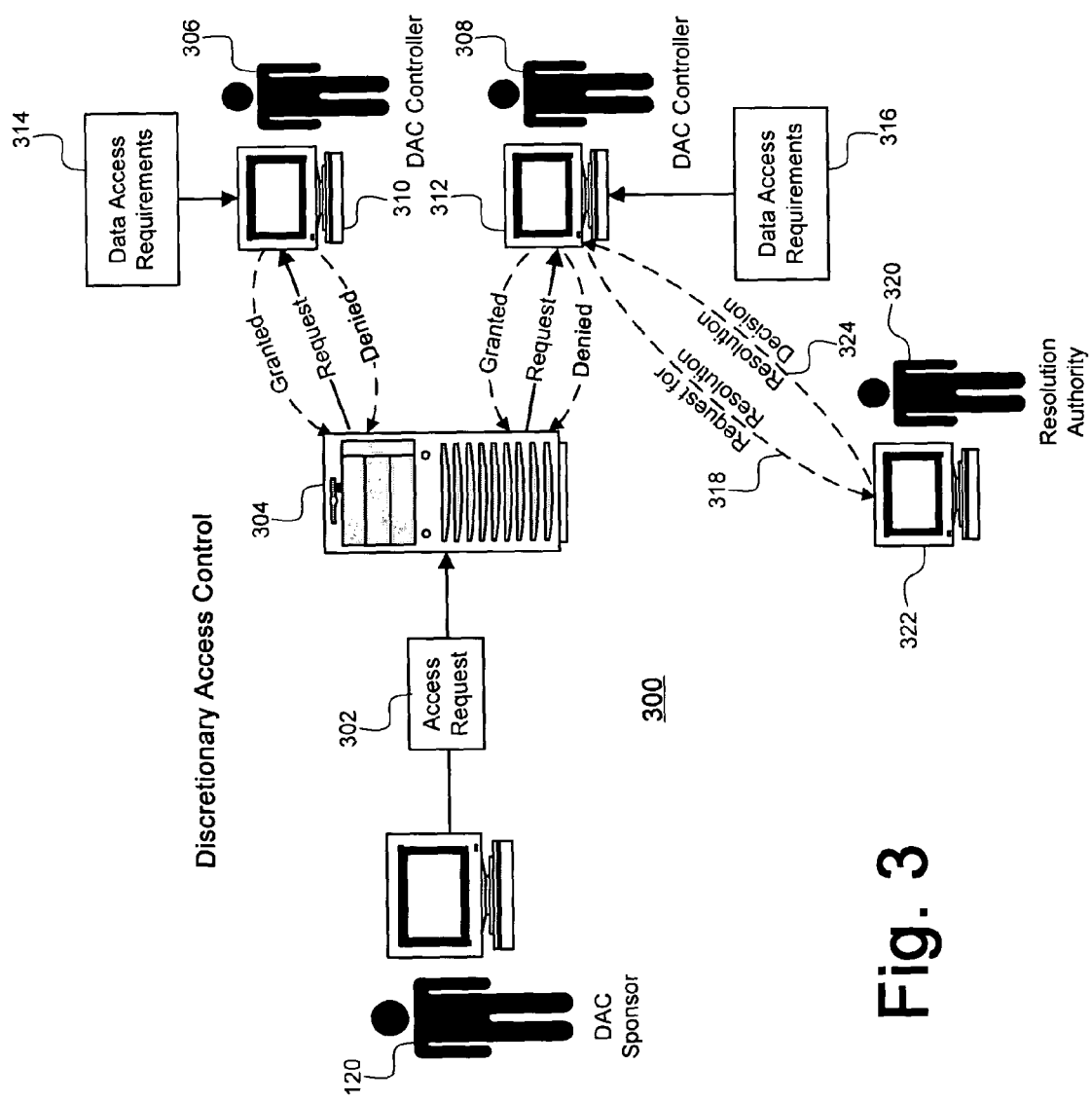
FIG. 3 is a flow diagram illustrating an exemplary process for accessing secured data using the resources of FIG. 2 in accordance with at least one embodiment of the present invention.

Referring now to FIG. 3, an exemplary network-based DAC access process 300 is illustrated in accordance with at least one embodiment of the present invention. As noted above, a grant of access by the DAC security level 106 (FIG. 1) preferably is required before an access candidate 108 may access the secured data 102 using the resources 110.

To initiate the DAC access process, the DAC sponsor 120 may prepare an electronic access request 302 for one or more portions of the secured data 102 on behalf of the access candidate 108 (FIG. 1). As with the electronic access request 210 of FIG. 2, the DAC sponsor 120 may use information obtained from the access candidate 108 in preparing the electronic access request 302. The DAC sponsor 120 then may submit the electronic access request 302 to a DAC security module 304, where the DAC security module 304 preferably is implemented as part of the network 202 (FIG. 2) or similar network. The DAC security module 304 preferably includes software and/or hardware adapted to receive the electronic access request 302 and to identify one or more DAC controllers associated with each of the one or more requested portions of the secured data 102. The DAC controllers may be identified based at least in part on the one or more data levels (e.g., application, group information or item information levels) to which the data portions are members or the data classes associated with each data portion. To illustrate, a DAC controller could be associated with each data level or a DAC controller could be associated with each data class. Alternatively, DAC controllers may be associated with various combinations of data levels and data classes. In the illustrated example, it is assumed that the electronic access request 302 requests access to data controlled by DAC controllers 306, 308.

The DAC security module 304 may be further adapted to forward the access request 302 to the applicable DAC controllers 306, 308. The access request 302 preferably is forwarded as an electronic communication received at and displayed on the workstations 310, 312 used by the DAC controllers 306, 308, respectively. The DAC controllers 306, 308 then may compare the attributes of the access candidate 108 with the access requirements 314, 316 of the corresponding data for which each DAC controller 306, 308 is responsible. Should the attributes comply with the access requirements considered by a DAC controller (i.e., access to the data controlled by a DAC controller is not prohibited), the DAC controller may provide an indication to the DAC security module 304 that access to the applicable data portion is to the DAC security module 304. The DAC security module 304 may then provide the same or similar indication to the DAC sponsor 120 or access candidate 108. The DAC security module 304, or alternatively the corresponding DAC controller, then may grant access to the requested data portion.

Should the attributes conflict with the access requirements considered by a DAC controller (i.e., access to data controlled by a DAC controller is prohibited without authorization), the DAC controller, or alternatively the DAC security module 304, may submit a resolution request 318 to the applicable resolution authority 320, where the resolution authority 320 includes an entity or automated system enabled to authorize the grant of access in such cases. As with the electronic access request 302, the resolution request 318 may be transmitted as an electronic communication to a workstation 322 used by the resolution authority 320.

The resolution authority 320 may consider the access requirements, access candidate attributes, and additional information (such as an indication of the need for access) and may request additional information in deciding whether to grant or deny, in whole or in part, authorization. After deciding whether a grant of authority is appropriate, the resolution authority 320 may transmit an indication 324 of its decision to the appropriate DAC controller. If authorized, the DAC controller may grant access to the access candidate 108 and provide an indication of such to the access candidate 108 or the DAC sponsor 120. If a grant of authority is deemed inappropriate, the DAC controller may provide an indication of such to the DAC sponsor 120 or access candidate 108.

In the event that access is granted for some but not all requested data portions, the DAC security module 304 may grant access only to the authorized portions or the security module 304 may deny access to all of the requested data portions. In the latter instance, the DAC sponsor 120 may be directed to modify the access request 302 or submit a new request so that only the authorized portions are requested.

Figure 4:
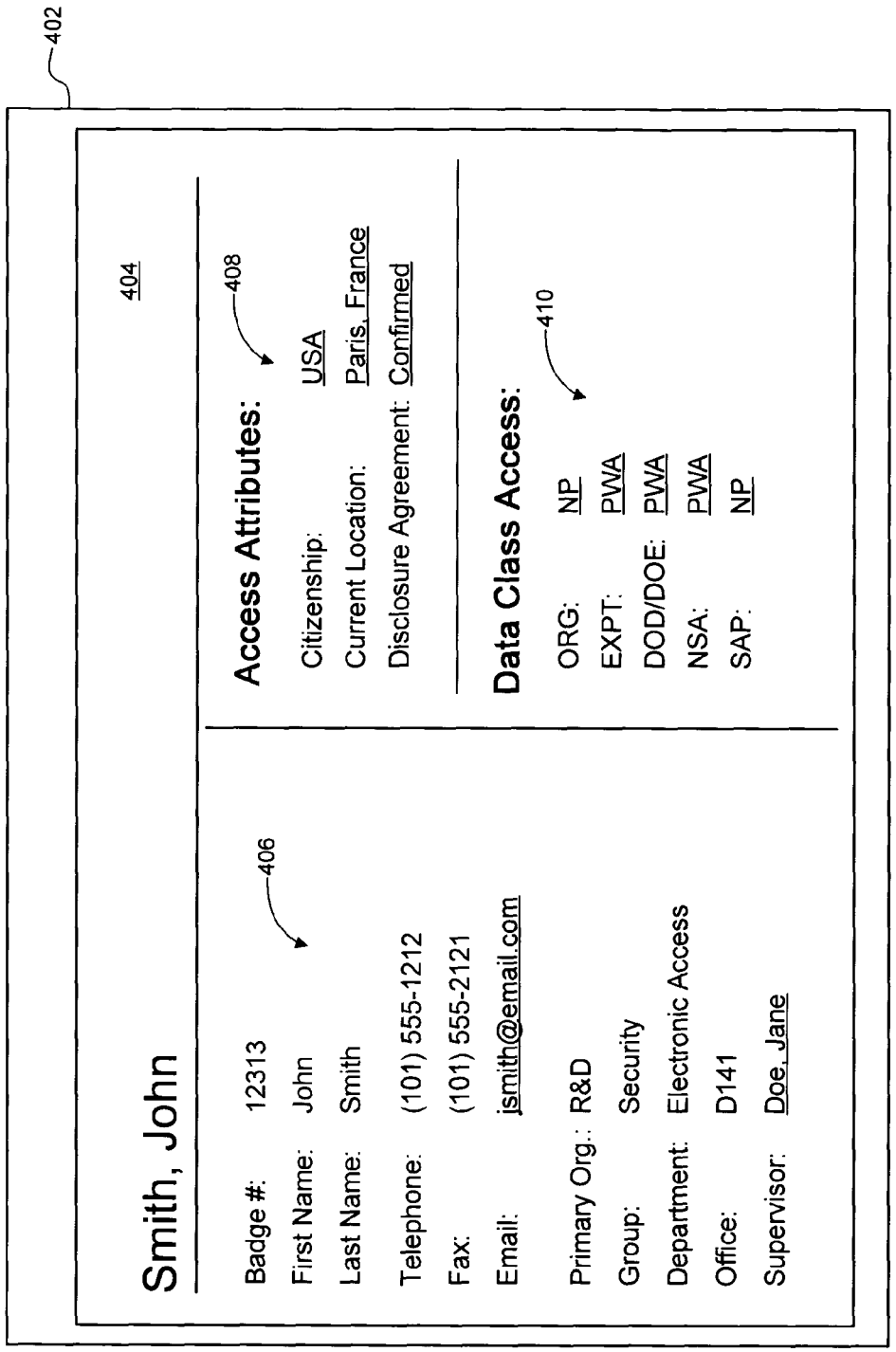
FIG. 4 is a block diagram illustrating an exemplary implementation of an access profile as part of a graphical display in accordance with at least one embodiment of the present invention.

Referring now to FIG. 4, an exemplary implementation of the access profile 116A/116B/212 as an entry in an electronic directory is illustrated in accordance with at least one embodiment of the present invention. The electronic directory (not shown) may include, for example, an electronic contact information directory that is accessible, for example, via a web browser 402. To illustrate, information associated with an access candidate named "John Smith," may be displayed by the web browser 402 as a profile table 404 having a contact information portion 406, an access attributes portion 408 and a data class access portion 410. The contact information portion 406 may be used to display contact and organizational information associated with the access candidate, such as name, telephone number, email address, office location, supervisor, and the like. The access attributes portion 408 may be used to display various access attributes associated with the access candidate, such as, for example, citizenship, current location, and the existence of a valid data access agreement. In the illustrated example, the entry for access candidate "John Smith" indicates that he is a US citizen who is currently located in Paris, France and further indicating that he has signed a valid data access agreement. The data class attributes portion 410 may be used to display indications of whether the access candidate is permitted to access data associated with corresponding data classes. In the illustrated example, the entry for the access candidate "John Smith" indicates that access by John Smith to data associated with the organizational ("ORG") data class or the special access program ("SAP") data class is not prohibited ("NP"), whereas access by John Smith to data associated with the export controlled ("EXPT") data class, the Department of Defense/Department of Energy ("DOD/DOE") data class, and the National Security Agency ("NSA") data class is prohibited without authorization ("PWA"). Of course, these data classes and levels of authorization are exemplary only and in no way limit the scope of the invention. The determination and input of an access candidate's access status (i.e., NP or PWA) for the data classes may be performed when the entry for the access candidate is formed or when each data class is considered for the first time as a result of an access request.

Referring now to FIG. 5, an exemplary access requirements table 502 for display on a web browser 402 or other graphical user interface (GUI) is illustrated in accordance with at least one embodiment of the present invention. The access requirements table 502 preferably includes one or more tables illustrating the access status (i.e., not prohibited ("NP") or prohibited without authorization ("PWA")) for one or more data classes (depicted as the column headers) based on one or more access attributes (depicted as the row headers) of access candidates. To illustrate, for a U.S. citizen having a valid data access agreement and who is currently located in the U.S. or its territories, access to the NSA data class is not prohibited, whereas access to the NSA data class is prohibited without authorization for a foreign national having a valid access agreement and who is also located in the U.S. The access requirements table 502 also may include an additional requirements portion 504 indicating additional requirements in certain instances, such as, for example, a requirement that an export license be granted before access authorization is given to an access candidate who is a foreign national in the U.S. who is requesting access to the export data class.

The profile table 404 of FIG. 4 and the access requirements table 502 of FIG. 5 may be used by a MAC controller or DAC controller to quickly determine whether MAC access or DAC access should be granted or denied for a given access candidate. For example, a MAC controller may quickly review the information available in the access attributes portion 408 of the profile table 404 to determine whether to grant MAC access based on the correlation of the access attributes of the access candidate with the MAC access requirements. Similarly, a DAC controller may quickly review the data class access portion 410 of the profile table 404 to determine if access to a data portion having data associated with certain data classes should be granted. In the event that the data class access portion isn't filled in or isn't available for viewing, the DAC controller may use the attributes listed in the access attributes portion 408 to identify the applicable section of the access requirements table 502 to determine if access should be granted or if authorization should be sought.

Embodiments of the invention may be implemented as a tangible computer-readable medium having instructions stored thereon, an article of manufacture including a non-transitory computer-readable medium, a computer-readable medium having instructions stored thereon, and/or a computer program product. Other embodiments, uses, and advantages of the invention will be apparent to those skilled in the art from consideration of the specification and practice of the invention disclosed herein. The embodiments described in the specification and drawings should be considered as being exemplary only. The scope of the invention is accordingly intended to be limited only by the following claims and equivalents thereof.

What is claimed is:

1. A method comprising:
 receiving, using a processing device, a first request, from a first sponsor of an access candidate, for access to a first security level in a computer network, wherein the first security level secures computational resources for accessing electronic data;

determining, using the processing device, whether access candidate attributes satisfy access requirements of the resources, such that:

if access to the first security level is prohibited, allowing the first sponsor of the access candidate to revise the access candidate attributes and resubmit the revised access candidate attributes for reconsideration and repeating the determining;

if access to the first security level is not prohibited, granting access to the first security level;

receiving, using the processing device, a second request, from a second sponsor of the access candidate, for access to a second security level in the computer network in response to the granting of access to the first security level, wherein the second security level secures the electronic data;

determining, using the processing device, whether the access candidate attributes satisfy access requirements of the electronic data secured by the second security level;

obtaining authorization for the second request from a resolution authority if the access candidate attributes fail to satisfy the access requirements of the electronic data in response to a determination indicating that access to the second security level is prohibited; and in response to obtaining the authorization from the resolution authority, granting the access candidate access to the second security level.

2. The method of claim 1, further comprising granting access to the second security level if the access candidate attributes satisfy the access requirements of the electronic data.

3. The method of claim 1, further comprising denying access to the second security level if the authorization for the second request cannot be obtained.

4. The method of claim 1, wherein at least one of the access requirements of the resources and the access requirements of the electronic data are represented as part of a graphical display associated with the access candidate and accessed for display to a controller via a network.

5. The method of claim 1, wherein at least one of the access requirements of the resource and the access requirements of the electronic data comprise a citizenship status of the access candidate or a current location of the access candidate.

6. The method of claim 5, wherein the access candidate attributes comprise a citizenship status of the access candidate or a current location of the access candidate.

7. The method as in claim 1, further comprising granting a waiver of the access requirements.

8. The method of claim 1, further comprising receiving supplemental evidence verifying the access candidate attributes.

9. A method comprising:

receiving, using a processing device, a first request, from a first sponsor of an access candidate, for physical access to a computer network;

determining, using the processing device, whether access candidate attributes satisfy access requirements of physical access, such that if physical access to the computer network is prohibited, allowing the first sponsor of the access candidate to revise the access candidate attributes and resubmit the revised access candidate attributes for reconsideration and repeating the determining;

if physical access to the computer network is not prohibited, granting the physical access to the computer network;

receiving, using the processing device, a second request, from a second sponsor of the access candidate, for access to electronic data in the computer network in response to the granting of physical access to the computer network;

determining, using the processing device, whether the access candidate attributes satisfy access requirements of the electronic data;

obtaining authorization for the second request from a resolution authority if the access candidate attributes fail to satisfy access requirements of the electronic data in response to a determination indicating that access to the electronic data is prohibited; and in response to obtaining the authorization from the resolution authority, granting the access candidate access to the electronic data.

10. The method of claim 9, further comprising granting access to the electronic data in response to a comparison of the access candidate attributes with the access requirements of the electronic data indicating that access to the electronic data is not prohibited.

11. The method of claim 9, further comprising denying access to the electronic data if the authorization for the second request cannot be obtained.

12. The method of claim 9, wherein the access candidate attributes are represented as part of a graphical display associated with the access candidate and accessed for display via a network.

13. The method of claim 9, wherein at least one of the access requirements of the electronic data and the access requirements of physical access comprise a valid data access agreement with the access candidate; a current location of the access candidate; or a citizenship status of the access candidate.

14. The method of claim 13, wherein the access candidate attributes comprise an existence of a data access agreement; a current location of the access candidate; or a citizenship status of the access candidate.

15. The method as in claim 9, wherein at least one of the access requirements of the electronic data and access requirements of physical access comprise a current location of the access candidate or a citizenship status of the access candidate.

16. The method of claim 9, wherein at least one of the request for physical access or the request for access to the electronic data is submitted by more than one sponsor of the access candidate.

17. A method comprising:

identifying, using a processing device, a plurality of data subsets of electronic data, wherein respective data subsets correspond to respective sets of access requirements;

determining, using the processing device, at least one data class associated with the respective data subsets, the at least one data class identifying at least a citizenship requirement and a location requirement for access to data associated with the at least one data class;

receiving, using the processing device, a first request, from a first sponsor of an access candidate, for access to a first security level in a computer network, wherein the first security level secures physical access to a computer workstation for accessing the electronic data, the first request including access attributes of the access candidate comprising an indication of a citizenship status of the access candidate, an indication of a current location of the access candidate, and an indication of an existence of a data access agreement with the access candidate;

determining, using the processing device, whether the access candidate attributes satisfy access requirements of the first security level, such that:
if access to the first security level is prohibited, allowing the first sponsor of the access candidate to revise the access candidate attributes and resubmit the revised access candidate attributes for reconsideration and repeating the determining;

if access to the first security level is not prohibited, granting access to the first security level;

receiving, using the processing device, a second request, from a second sponsor of the access candidate, for access to a second security level in the computer network in response to the granting of access to the first security level, wherein the second security level secures access to at least one of the plurality of data subsets;

determining, using the processing device, whether the access candidate attributes satisfy the respective set of access requirements corresponding to the at least one of the plurality of data subsets;

obtaining authorization for the second request from a resolution authority if the access candidate attributes fail to satisfy the respective set of access requirements corresponding to the at least one of the plurality of data subsets in response to a determination indicating that access to the at least one of the plurality of data subsets is prohibited; and in response to obtaining the authorization from the resolution authority, granting the access candidate access to the second security level.

18. The system of claim 17, wherein the data subsets are separated into the at least one data class based on a data provider of the data.

19. The method of claim 17, wherein the physical access comprises physical access to a facility housing the computer workstation.

20. The method of claim 17, wherein the physical access comprises logging on to the computer workstation.

21. A system comprising:
storage means for receiving and storing electronic data using a computer network;
means for evaluating a first request for access to one or more resources in the computer network, wherein the resources secure the electronic data, wherein an evaluation of the first request includes a first comparison of one or more attributes of the access candidate with one or more access requirements associated with the resources, such that:
if the first comparison indicates that access is prohibited, means for allowing a sponsor of the access candidate to revise the one or more attributes of the access candidate and resubmit the revised attributes for reconsideration and repeating the determining;
if the first comparison indicates that access is not prohibited, granting access to the one or more resources;
means for evaluating a second request for access to the electronic data by the one or more resources, wherein an evaluation of the second request includes a second comparison of the one or more attributes of the access candidate with one or more access requirements associated with the electronic data;
means for obtaining authorization for the second request from a resolution authority if the one or more attributes of the access candidate fails to satisfy one or more access requirements associated with the electronic data in response to the evaluation of the second request indicating that access to the electronic data is prohibited; and
means for granting, in response to obtaining the authorization from the resolution authority, the access candidate access to the electronic data using the one or more resources.

22. The system of claim 21, further comprising means for granting access to the electronic data using the one or more resources configured to access and manipulate the electronic data if the second comparison indicates that access to the electronic data is not prohibited.

23. The system of claim 21, wherein the access candidate is denied access to the electronic data if the authorization for the second request cannot be obtained.

24. The system of claim 21, wherein the one or more access candidate attributes are represented as part of a graphical display associated with the access candidate and accessed for display via a network.

25. The system of claim 21, wherein at least one of the one or more access requirements associated with the recourses and the one or more access requirements associated with the electronic data relates to at least one of: a valid data access agreement with a potential access candidate; a current location of the potential access candidate; or a citizenship status of the potential access candidate.

26. The system of claim 25, wherein the one or more access candidate attributes relates to at least one of: an indication an existence of a data access agreement with the access candidate; a current location of the access candidate; or a citizenship status of the access candidate.

27. The system of claim 21, wherein the one or more access requirements associated with the electronic data includes at least one of a current location of the access candidate or a citizenship status of the access candidate.

28. A method comprising:
receiving, using a controller in a computer network associated with secured electronic data, a request for access to the secured electronic data in the computer network;
comparing, using the controller, one or more attributes of an access candidate with one or more access requirements associated with the secured electronic data;
requesting authorization for the request from a resolution authority if the one or more attributes of the access candidate fails to satisfy the one or more access requirements associated with the secured electronic data;
in response to receiving the authorization from the resolution authority, granting in whole or in part, using the controller, access to the secured electronic data; and
in response to not receiving the authorization from the resolution authority, allowing a sponsor of the access candidate to revise the one or more attributes of the access candidate and resubmit the revised attributes for reconsideration and repeating the comparing.

29. The method of claim 28, further comprising granting access to the secured electronic data if the one or more attributes of the access candidate satisfies the one or more access requirements associated with the secured electronic data.

30. The method of claim 28, wherein the one or more access requirements associated with the secured electronic data are represented as part of a graphical display associated with the access candidate and accessed for display to the controller via a network.

31. The method of claim 28, wherein the one or more access requirements associated with the secured electronic data are related to at least one of a citizenship status or a current location of the access candidate.

32. The method of claim 31, wherein the one or more attributes of the access candidate include at least one of a citizenship status or a current location of the access candidate.

33. A method comprising:
receiving, using a controller in a computer network associated with secured electronic data in the computer network, a request for access to the secured electronic data in the computer network;
comparing, using the controller, one or more attributes of an access candidate with one or more access requirements associated with the secured electronic data such that:
if access by the access candidate is not prohibited, granting access to the secured electronic data;
if access by the access candidate is prohibited, requesting authorization for the request from a resolution authority;
in response to receiving the authorization from the resolution authority, granting in whole or in part, using the controller, access to the secured electronic data; and
in response to not receiving the authorization from the resolution authority, allowing a sponsor of the access candidate to revise the one or more attributes of the access candidate and resubmit the revised attributes for reconsideration and repeating the comparing.

34. An article of manufacture including a non-transitory computer-readable medium having instructions stored thereon, execution of which causes a processing device to perform operations comprising:
receiving, using a processing device, a request for access to a first security level in a computer network;
comparing, using the processing device, one or more attributes of an access candidate with one or more access requirements associated with the first security level, such that:
if access to the first security level is prohibited, allowing a first sponsor of the access candidate to revise the one or more attributes of the access candidate and resubmit the revised attributes for reconsideration and repeating the comparing;
if access to the first security level is not prohibited, granting, using the processing device, access to the first security level based on a comparison indicating that access by the access candidate to the first security level is not prohibited;
receiving, using the processing device, a request for access to a second security level in the computer network;
obtaining authorization for the request from a resolution authority in response to a comparison indicating that access to the second security level by the access candidate is prohibited.

35. The article of manufacture of claim 34, further comprising granting access to the second security level in response to a comparison of the one or more attributes of the access candidate with the one or more access requirements associated with the second security level indicating that access to the second security level by the access candidate is not prohibited.

36. The article of manufacture of claim 34, further comprising denying access to the second security level if the authorization for the request cannot be obtained.

37. The article of manufacture of claim 34, wherein the one or more attributes of the access candidate is represented as part of a graphical display associated with the access candidate and accessed for display via a network.

38. The article of manufacture of claim 34, wherein the one or more access requirements associated with the first security level relates to at least one of: a valid data access agreement with the access candidate; a current location of the access candidate; or a citizenship status of the access candidate.

39. The article of manufacture of claim 38, wherein the one or more attributes of the access candidate relates to at least one of: an indication of whether the access candidate has a data access agreement; a current location of the access candidate; or a citizenship status of the access candidate.

40. The article of manufacture of claim 34, wherein the one or more access requirements associated with the second security level relates to at least one of a current location of the access candidate or a citizenship status of the access candidate.

41. The article of manufacture of claim 34, wherein at least one of the request for access to the first security level or the request for access to the second security level is submitted by one or more sponsors.

* * * * *

UNITED STATES PATENT AND TRADEMARK OFFICE
CERTIFICATE OF CORRECTION

| | | |
|---|---|---|
| PATENT NO. | : 8,176,320 B1 | |
| APPLICATION NO. | : 10/659368 | |
| DATED | : May 8, 2012 | |
| INVENTOR(S) | : Belanger et al. | |

It is certified that error appears in the above-identified patent and that said Letters Patent is hereby corrected as shown below:

In Column 13, Line 51, in Claim 7, delete "as in" and insert -- of --, therefor.

In Column 13, Line 62, in Claim 9, delete "that" and insert -- that: --, therefor.

In Column 14, Line 42, in Claim 15, delete "as in" and insert -- of --, therefor.

In Column 15, Line 34, in Claim 18, delete "system" and insert -- method --, therefor.

In Column 16, Lines 29-30, in Claim 26, delete "an indication an existence" and insert -- an indication of an existence --, therefor.

Signed and Sealed this
Thirty-first Day of July, 2012

David J. Kappos
*Director of the United States Patent and Trademark Office*